United States Patent
You et al.

(10) Patent No.: US 8,449,999 B2
(45) Date of Patent: May 28, 2013

(54) SAFETY BATTERY CELL WITH SAFETY EXHAUST PART CORRESPONDING TO THE ELECTRODE LEAD

(75) Inventors: Seungjae You, Daejeon (KR); Min Su Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 504 days.

(21) Appl. No.: 12/596,532

(22) PCT Filed: Apr. 18, 2008

(86) PCT No.: PCT/KR2008/002197
§ 371 (c)(1),
(2), (4) Date: Jun. 21, 2010

(87) PCT Pub. No.: WO2008/130148
PCT Pub. Date: Oct. 30, 2008

(65) Prior Publication Data
US 2010/0266881 A1 Oct. 21, 2010

(30) Foreign Application Priority Data

Apr. 20, 2007 (KR) ........................ 10-2007-0038638

(51) Int. Cl.
*H01M 2/12* (2006.01)
(52) U.S. Cl.
USPC ............................................. 429/56; 429/53
(58) Field of Classification Search
CPC ......... H01M 2/00; H01M 2/12; H01M 2/1241; H01M 2/1294
USPC .................................................... 429/56, 53
See application file for complete search history.

(56) References Cited

U.S. PATENT DOCUMENTS

| 4,064,323 A | 12/1977 | Messing |
| 5,004,655 A * | 4/1991 | Symanski ........................ 429/82 |

(Continued)

FOREIGN PATENT DOCUMENTS

| JP | 10-55792 A | 2/1998 |
| JP | 2001-93489 A | 4/2001 |

(Continued)

OTHER PUBLICATIONS

Kim et al., Machine translation of KR 2004-110156 A, Dec. 2004.*

(Continued)

*Primary Examiner* — Basia Ridley
*Assistant Examiner* — Sean P Cullen
(74) *Attorney, Agent, or Firm* — Birch, Stewart, Kolasch & Birch, LLP

(57) ABSTRACT

Disclosed herein is a battery cell constructed in a structure in which an electrode assembly is mounted in a battery case made of a laminate sheet including a metal layer and a resin layer, and the battery case is thermally welded along the edge of a receiving part thereof to form a sealing part, wherein a weak part is formed at a portion of the sealing part ('an electrode lea correspondence portion') corresponding to one of electrode leads (a, b) connected to the electrode assembly, e.g., the electrode lead (a) having relatively low flexibility, the weak part being physically deformed, such that internal gas is discharged outside through the weak part, when predetermined pressure is applied to the weak part, and the weak part is not formed at an electrode lead correspondence portion of the other electrode lead (b).

10 Claims, 6 Drawing Sheets

U.S. PATENT DOCUMENTS

| | | |
|---|---|---|
| 2002/0160257 A1 | 10/2002 | Lee et al. |
| 2002/0160258 A1 | 10/2002 | Lee et al. |
| 2003/0013012 A1 | 1/2003 | Ahn et al. |
| 2004/0175609 A1 | 9/2004 | Yageta et al. |
| 2005/0058896 A1* | 3/2005 | Nomura et al. ............... 429/142 |
| 2005/0158622 A1 | 7/2005 | Mizuta et al. |
| 2007/0026307 A1 | 2/2007 | Kim |

FOREIGN PATENT DOCUMENTS

| | | |
|---|---|---|
| JP | 2003-132868 A | 5/2003 |
| JP | 2003-523059 A | 7/2003 |
| JP | 2003-523060 A | 7/2003 |
| JP | 2003-523061 A | 7/2003 |
| JP | 2007-42628 A | 2/2007 |
| KR | 10-2001-0082058 A | 8/2001 |
| KR | 10-2001-0082059 A | 8/2001 |
| KR | 10-2001-0082060 A | 8/2001 |
| KR | 10-2004-0017094 A | 2/2004 |
| KR | 10-2004-0110156 A | 12/2004 |
| KR | 10-2005-0075702 A | 7/2005 |

OTHER PUBLICATIONS

Japanese Office Action for Japanese Application No. 2010-503978 dated Sep. 4, 2012.

* cited by examiner

-PRIOR ART-

-PRIOR ART-

-PRIOR ART-

-PRIOR ART-

-PRIOR ART-

SAFETY BATTERY CELL WITH SAFETY EXHAUST PART CORRESPONDING TO THE ELECTRODE LEAD

FIELD OF THE INVENTION

The present invention relates to a battery cell of improved safety, and, more particularly, to a battery cell constructed in a structure in which an electrode assembly is mounted in a battery case made of a laminate sheet including a metal layer and a resin layer, and the battery case is thermally welded along the edge of a receiving part thereof to form a sealing part, wherein a weak part is formed at a portion of the sealing part ('an electrode lead correspondence portion') corresponding to one of electrode leads (a, b) connected to the electrode assembly, e.g., the electrode lead (a) having relatively low flexibility, the weak part being physically deformed, such that internal gas is discharged outside through the weak part, when predetermined pressure is applied to the weak part, and the weak part is not formed at an electrode lead correspondence portion of the other electrode lead (b).

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially and widely used.

A secondary battery has attracted considerable attention as an energy source for power-driven devices, such as electric bicycles (E-bikes), electric vehicles (EV), or hybrid electric vehicles (HEV), as well as an energy source for mobile wireless electronic devices, such as mobile phones, digital cameras, personal digital assistants (PDAs), and laptop computers.

A small-sized battery pack having a battery cell packed therein is used for small-sized devices, such as mobile phones and digital cameras. On the other hand, a middle- or large-sized battery pack having a battery pack, which includes two or more battery cells (hereinafter, occasionally referred to as a "multi-cell") connected in parallel and/or in series with each other, packed therein is used for middle- or large-sized devices, such as laptop computers and electric vehicles.

As previously described, a lithium secondary battery has excellent electrical properties; however, the lithium secondary battery has low safety. For example, when abnormal operations, such as overcharge, overdischarge, exposure to high temperature, and electrical short circuits, of the lithium secondary battery occur, decomposition of active materials and an electrolyte, which are components of the battery, is caused, with the result that heat and gas are generated, and the high-temperature and high-pressure condition caused by the generation of the heat and the gas accelerates the above-mentioned decomposition. Eventually, fire or explosion may occur.

For this reason, the lithium secondary battery is provided with a safety system, such as a protection circuit for interrupting electric current during overcharge, overdischarge, or overcurrent of the battery, a positive temperature coefficient (PTC) element whose resistance greatly increases so as to interrupt electric current when the temperature of the battery increases, and a bent safety member for interrupting electric current or discharging gas when pressure increases due to the generation of the gas. In the case of a small-sized cylindrical secondary battery, for example, the PTC element and the bent safety member are usually disposed at the top of an electrode assembly (a generating element) having a cathode/separator/anode structure, which is mounted in a cylindrical case. In the case of a prismatic or pouch-shaped small-sized secondary battery, on the other hand, the protection circuit module and the PTC element are usually mounted at the upper end of a prismatic case or a pouch-shaped case, in which the generating element is mounted in a sealed state.

The safety problem of the lithium secondary battery is even more serious for a middle- or large-sized battery pack having a multi-cell structure. Since a plurality of battery cells are used in the multi-cell structure battery pack, the abnormal operation of some of the battery cells may cause the abnormal operation of the other battery cells, with the result that fire or explosion may occur, which may lead to a large-scale accident. For this reason, the middle- or large-sized battery pack is provided with a safety system, such as a fuse, a bimetal, and a battery management system (BMS), for protecting the battery cells from the overcharge, the overdischarge, and the overcurrent.

However, as the lithium secondary battery is continuously used, i.e., as the lithium secondary battery is continuously charged and discharged, the generating element and the electrically connecting members are gradually degraded. For example, the degradation of the generating element leads to the decomposition of the electrode material and the electrolyte, by which gas is generated. As a result, the battery cell (the cylindrical or prismatic case or the pouch-shaped case) gradually swells. In the normal state of the lithium secondary battery, the safety system, i.e., the BMS detects the overdischarge, the overcharge, and the overcurrent, and controls/protects the battery pack. In the abnormal state of the lithium secondary battery, however, when the BMS does not operate, a possibility of danger increases, and it is difficult to control the battery pack for securing the safety of the battery pack. The middle- or large-sized battery pack is generally constructed in a structure in which a plurality of battery cells is fixedly mounted in a predetermined case. As a result, the respective swelling battery cells are further pressurized in the restrictive case, and therefore, a possibility of fire or explosion greatly increases under the abnormal operation condition of the battery pack.

Various attempts have been carried out to solve the safety-related problem of a secondary battery. In particular, there has been developed a technology for discharging internal gas of a secondary battery to a predetermined region of a battery case when the secondary battery swells due to overcharge and overdischarge of the secondary battery.

For example, Korean Patent Application Publication No. 2002-49208 discloses a structure in which an open piece, made of a resin material having a melting point lower than that of a sealing part of a pouch-shaped battery case, is included in the sealing part of a pouch-shaped battery case, and, when the internal temperature or the internal pressure of a battery excessively increases, the open piece is melted, whereby the sealing state of the battery is released to prevent the combustion or explosion of the battery.

Also, Japanese Patent Application Publication No. 2001-93489 discloses a structure in which a resin film having a melting point lower than that of a thermal welding layer resin film of a laminate sheet constituting a battery case is included in a portion of a sealing part of the battery case as an inner layer, and the resin film responds to the temperature of a battery at high temperature and high pressure, with the result that the resin film portion, having the low melting point, is softened, melted, and deformed, whereby the sealing part is partially opened, and therefore, gas is discharged from the battery.

However, the above-mentioned technologies need additional components, such as the open piece or the resin film, with the result that manufacturing costs of the battery increases. Also, additional processes are required, with the result that the productivity of the battery decreases. Furthermore, the above-mentioned structures are constructed in a structure in which the predetermined region is opened depending upon the melting point of the predetermined member, with the result that operational reliability is low.

Also, Korean Patent Application Publication No. 2006-112035 discloses a secondary battery including a sealant which is mounted at an electrode lead, in such a manner that the sealant comes into tight contact with a case, for achieving sealing between the electrode lead and the case, wherein the sealant is provided at one side thereof with stress concentration portions which break due to the internal pressure of the case for discharging gas outside. According to this publication, as shown in FIG. 5, the stress concentration portions are formed on an insulative film (sealant) inserted in the sealing part while the stress concentration portions are attached to the top and bottom of the electrode lead, and the stress concentration portions are constructed in the form of a notch or a non-attachment region.

However, when the predetermined notches or non-attachment regions are formed on the insulative film, electrical insulation property of the battery and sealability at the sealing part greatly weaken, with the result that an internal short circuit may occur or external moisture or air is introduced into the battery, whereby the efficiency of the battery lowers. Furthermore, the stress concentration portions easily respond to even a slight amount of gas generated during the normal operation of the battery, with the result that the sealed state of the battery may be released.

Therefore, there is a high necessity for a technology that is capable of guiding internal pressure of a battery cell generated when the battery cell malfunctions in a predetermined direction, while securing the sealability of the battery cell during the normal operation of the battery cell, without using additional components, whereby securing the safety of the battery cell with high reliability.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when weak part is formed at a battery case corresponding to one of electrode leads connected to an electrode assembly mounted in the battery case, made of a laminate sheet, e.g., an electrode lead exhibiting relatively low flexibility, it is possible to discharge outside in a predetermined direction at the time of expansion of a battery due to overcharge and overdischarge of the battery through the addition of only a simple process, thereby greatly improving the safety of the battery. The present invention has been completed based on these findings.

In accordance with one aspect of the present invention, the above and other objects can be accomplished by the provision of a battery cell constructed in a structure in which an electrode assembly is mounted in a battery case made of a laminate sheet including a metal layer and a resin layer, and the battery case is thermally welded along the edge of a receiving part thereof to form a sealing part, wherein a weak part is formed at a portion of the sealing part ('an electrode lead correspondence portion') corresponding to one of electrode leads (a, b) connected to the electrode assembly, e.g., the electrode lead (a) having relatively low flexibility, the weak part being physically deformed, such that internal gas is discharged outside through the weak part, when predetermined pressure is applied to the weak part, and the weak part is not formed at an electrode lead correspondence portion of the other electrode lead (b).

That is, the battery cell according to the present invention is constructed in a structure in which the weak part is formed at a portion of the sealing part of the battery case, which is welded at the top and bottom of the cathode lead or the anode lead of the battery cell, specifically the electrode lead having low flexibility, for sealing the battery. Consequently, the battery cell according to the present invention is capable of discharging gas outside in a predetermined direction through the weak portion having a sealing force less than other sealing region of the battery case when the internal pressure of the battery abnormally increases due to the malfunction of the battery, such as overcharge, overdischarge, an internal short circuit, or the like.

Generally, the electrode leads (the cathode lead and the anode lead) connected to the electrode assembly are made of different materials for operational characteristics of the secondary battery. Since the electrode leads are made of different materials, the electrode leads have different flexibilities. Consequently, when the battery case swells due to abnormal internal pressure of the battery, the section of the electrode lead having relatively high flexibility is deformed in a shape similar to the deformed shape of the battery case. On the other hand, the electrode lead having relatively low flexibility exhibits high strength, and therefore, the strain of the low-flexibility electrode lead is small, with the result that, when high internal pressure is generated, stress is apt to concentrate at the sealing region of the battery case corresponding to the low-flexibility electrode lead.

According to the present invention, therefore, the weak part is formed at the sealing region of the battery case corresponding to the low-flexibility electrode lead, with the result that, when the internal pressure of the battery case increases to a dangerous level, it is possible to guide the discharge of gas in a predetermined direction, thereby improving the safety of the battery cell. The gas discharge direction is specified such that the gas is directed toward a predetermined position, and therefore, it is possible to form an additional discharge port for discharging toxic gas. For example, in an electric vehicle or a hybrid electric vehicle using a middle- or large-sized battery pack including a plurality of battery cells as a power source, it is possible to guide the discharge direction of toxic gas generated form the battery cells toward a region except a passenger space of the vehicle.

According to the present invention, the battery case is made of a laminate sheet including a metal barrier layer and a resin layer. Preferably, the battery case is a pouch-shaped case made of an aluminum laminate sheet. In a battery cell using the pouch-shaped case, electrode tabs extending from electrode plates of the electrode assembly are electrically connected to the corresponding electrode leads, for example, by welding. Also, insulative films may be partially attached to the top and bottom of the electrode leads in contact with the battery case for improving sealability between the electrode leads and the battery case, and, at the same time, securing electrical insulation between the electrode leads and the battery case.

Preferably, the laminate sheet of the battery case is constructed in a structure in which an outer resin layer exhibiting high durability is attached to one major surface (outer surface) of the metal barrier layer, and a thermally-weldable inner resin layer is attached to the other major surface (inner surface) of the metal barrier layer.

In a preferred embodiment, the metal barrier layer is made of aluminum, exhibiting a gas intercepting property and ductility sufficient to configure in the form of a thin film, or a material containing aluminum. It is required for the outer resin layer to exhibit high resistance against external environment. For this reason, the outer resin layer is preferably made of polymer resin exhibiting more than predetermined tensile strength and weather resistance, such as polyethylene terephthalate (PET) or oriented nylon film. Also, inner resin layer may be made of cast polypropylene (CPP) resin exhibiting a thermally-weldable property (a thermal adhesive property), a low hygroscopic property to restrain the penetration of an electrolyte, and a property not to swell or corrode by the electrode.

Generally, an electrode assembly used in a pouch-shaped battery cell may be classified as an electrode assembly constructed in a structure in which both a cathode lead and an anode lead are located at one side of an electrode assembly or an electrode assembly constructed in a structure in which a cathode lead and an anode lead are opposite to each other. According to the present invention, the electrode assembly, constructed in a structure in which the cathode lead and the anode lead are opposite to each other, is mounted in the battery case. This opposite-structure battery cell has advantages in that it is easy to electrically interconnect electrode terminals of unit cells of a middle- or large-sized battery module constructed in a structure in which a plurality of battery cells are stacked, and a possibility of short circuits is reduced.

According to the present invention, the electrode leads may be made of different materials. For example, one of the electrode leads, i.e., the electrode lead (b), may be made of aluminum, and the other electrode, i.e., the electrode lead (a), may be made of a nickel-copper alloy. That is, one end of each electrode lead is located in the battery case while the electrode tabs are attached to the one end of each electrode lead, and the other end of each electrode lead is exposed outside the battery case. One of the electrode leads, i.e., the cathode lead, may be formed of an aluminum thin leaf, and the other electrode lead, i.e., the anode lead, may be formed of a nickel-copper alloy thin leaf. During the manufacture of the battery cell, the electrode tabs are generally coupled to the corresponding electrode leads by spot welding. However, the coupling method is not limited only to the spot welding.

The electrode assembly is not particularly restricted so long as the electrode assembly is constructed in a structure in which separators are disposed respectively between cathodes and anodes. For example, the electrode assembly may be constructed in a folding, stacking, or stacking/folding type structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth therein.

According to the present invention, the weak part is preferably formed at the sealing part at the region corresponding to the electrode lead, i.e., the electrode lead correspondence portion. Consequently, the sealability at the electrode lead correspondence portion is sufficiently achieved by the insulative films, and therefore, the present invention provides a sealing force higher than the conventional art in which notches are formed at the insulative films.

The shape of the weak part is not particularly restricted so long as the weak part is constructed in a structure to release the sealability of the battery case when the internal pressure of the battery case increases to a dangerous level. Preferably, the weak part is formed in a slit structure. Here, the slit means a hole having relatively small width and relative large length.

In this structure, the sealability formed at the region where the slits are formed is released, when the internal pressure of the battery increases to a dangerous level due to the abnormal operation of the battery cell, with the result that the slits become open. Consequently, gas in the battery case is discharged outside, whereby the explosion of the battery is prevented.

The slits may be formed through the electrode lead correspondence portion of the sealing part. Alternatively, the slits may be formed through only the inner resin layer and/or the barrier layer of the sealing part.

The slits are constructed in a structure to effectively discharge high-pressure gas generated due to the malfunction of the battery cell out of the battery case. Preferably, the slits are arranged in the lateral direction (width direction) of the electrode assembly.

In this case, one or more slits may be formed. Preferably, the slits are arranged with a length equivalent to 30 to 90% of the width of the electrode lead. When the arrangement length of the slits is less than 30% of the width of the electrode lead, the slits may not easily open even when the internal gas of the battery case is high, with the result that it is difficult to discharge the internal gas of the battery case outside. On the other hand, when the arrangement length of the slits is greater than 90% of the width of the electrode lead, the slits may easily open even when the internal gas of the battery case is low. Consequently, the length of the slits increases, due to even normal expansion and contraction of the battery caused by the charge and discharge of the battery, with the result that the region where the slits are formed may deviate from the electrode lead correspondence portion, and therefore, the sealability of the sealing region is greatly lowered. When the sealability of the sealing region is lowered, moisture may penetrate into the battery even during the normal operation of the battery.

Since the weak part is formed at the sealing part at the region corresponding to the electrode lead, i.e., the electrode lead correspondence portion, as previously defined, the weak part does not affect the sealability of the sealing region under a condition in which the electrode lead is not deformed.

The weak part may be formed by various methods. For example, the corresponding region may be pressed using a predetermined member. Alternatively, the corresponding region may be cut open or cut out using a punch or a cutter. Also, the weak part may be formed at the electrode lead correspondence portion of the sealing part before the sealing part is sealed by thermal welding. Alternatively, the weak part may be formed at the electrode lead correspondence portion of the sealing part after the sealing part is sealed by thermal welding.

Since the battery cell according to the present invention exhibits long service life and high safety, the battery cell is preferably used as a unit cell of a middle- or large-sized battery module having high power and large capacity. Consequently, the present invention also provides a middle- or large-sized battery module including the battery cell as a unit cell. The structure of the middle- or large-sized battery module and a method of manufacturing the middle- or large-sized battery module are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
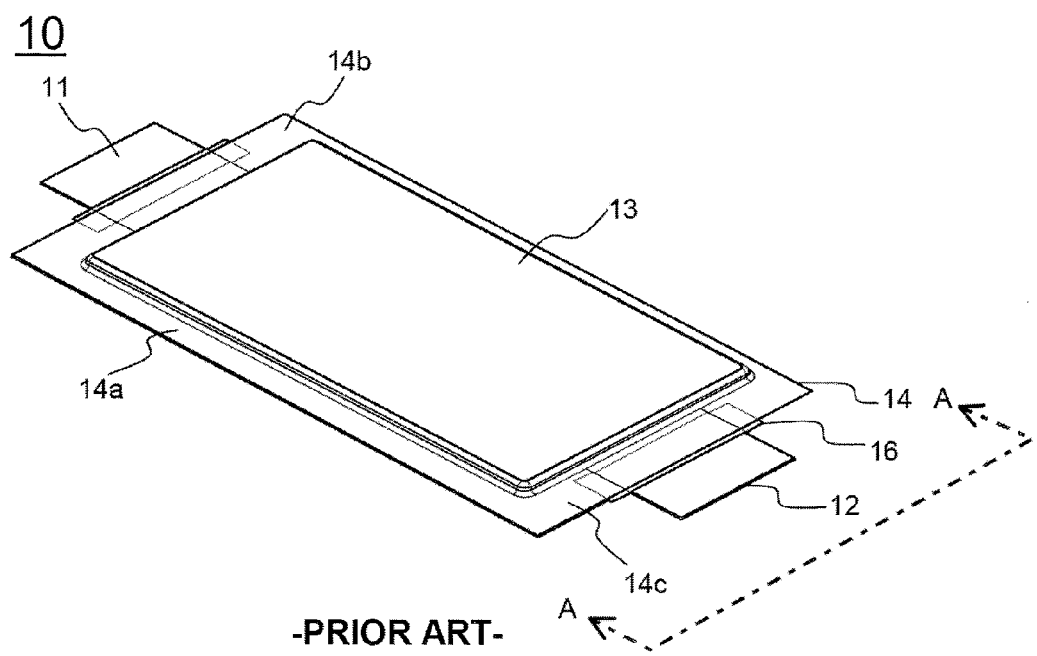
FIG. 1 is a perspective view illustrating a conventional representative pouch-shaped battery cell.
Figure 2:
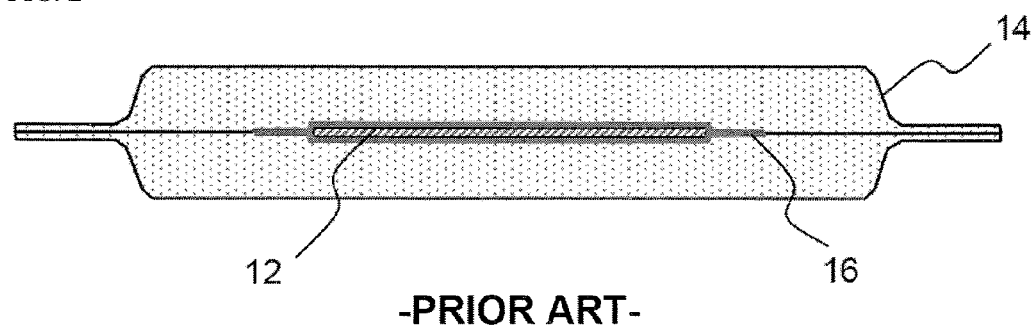
FIG. 2 is a typical view illustrating the shape of the battery cell when viewed in the direction of line A-A of FIG. 1.

FIG. 1 is a perspective view typically illustrating a conventional representative pouch-shaped battery cell, and FIG. 2 is a typical view illustrating the shape of the battery cell when viewed in the direction of line A-A of FIG. 1.

Referring to these drawings, the pouch-shaped battery cell 10 is constructed in a structure in which two electrode leads 11 and 12 protrude from upper and lower ends of an electrode assembly 13, respectively, while the electrode leads 11 and 12 are opposite to each other. A battery case 14 is constructed in a two-unit structure including an upper case and a lower case. Contact portions of the battery case 14, i.e., side portions 14a, upper end portions 14b, and lower end portions 14c of the battery case 14, are attached to each other, while the electrode assembly is mounted in a receiving part defined in the battery case 14, i.e., between the upper case and the lower case, whereby the battery cell 10 is manufactured.

The battery case 14 is generally constructed in a laminate structure of a resin layer/a metal film layer/a resin layer. Consequently, the resin layers of the battery case 14 are welded to each other by applying heat and pressure to the side portions 14a, upper end portions 14b, and lower end portions 14c of the battery case 14, while the respective portions are in contact with the corresponding portions. According to circumstances, a bonding agent may be used to attach the side portions 14a, the upper end portions 14b, and the lower end portions 14c of the battery case 14 to each other. At the side portions 14a of the battery case 14, the resin layers of the upper and lower battery cases are welded to each other, while the resin layers are in direct contact with each other, whereby uniform sealing is achieved at the side portions 14a of the battery case 14. However, the upper end portions 14b and the lower end portions 14c of the battery case 14 are thermally welded to each other, while film-shaped sealing members 16 are disposed between the electrode leads 11 and 12 and the battery case 14, in consideration of the thickness of the electrode leads 11 and 12 and the difference in material between the electrode leads 11 and 12 and the battery case 14, since the cathode lead 11 and the anode lead 12 protrude from the upper end portions 14b and the lower end portions 14c of the battery case 14.

Figure 3:
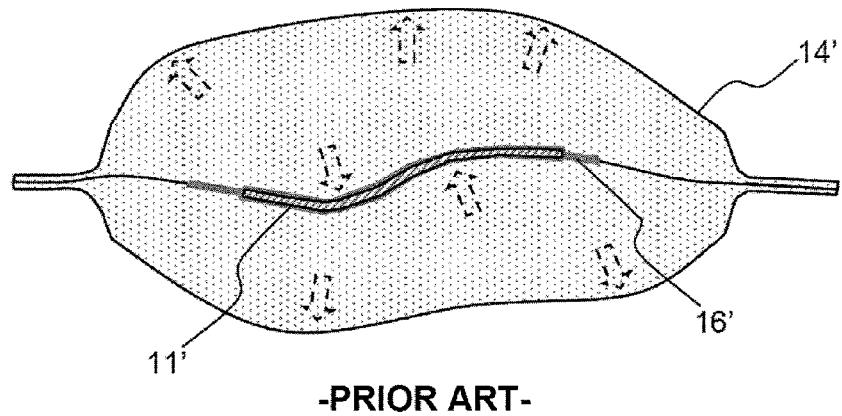
FIGS. 3 and 4 are vertical sectional views of the battery cell at cathode lead and anode lead regions respectively illustrating the shape of the battery cell of FIG. 1 which swells due to the increase of the internal pressure of the battery cell.
Figure 4:
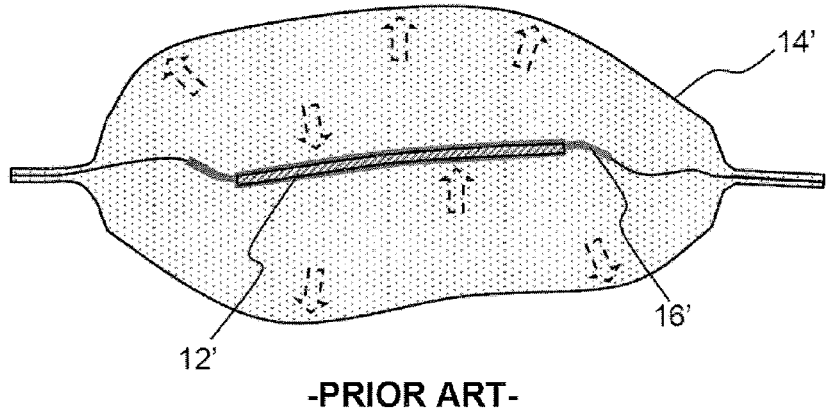
Figure 5:
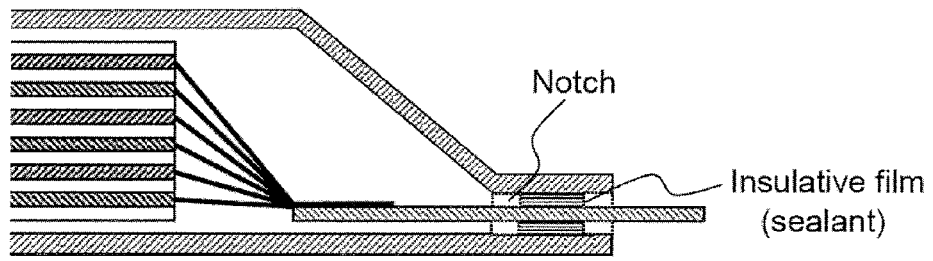
FIG. 5 is an enlarged view, in vertical section, illustrating the upper end of a battery cell according to Korean Patent Application Publication No. 2006-112035.

FIGS. 3 and 4 are vertical sectional views of the battery cell at cathode lead and anode lead regions respectively illustrating the shape of the battery cell of FIG. 1 which swells due to the increase of the internal pressure of the battery cell.

Referring first to FIG. 3, the cathode lead 11' is made of aluminum exhibiting high flexibility. When the internal pressure of the battery cell increases due to the abnormal operation of the battery cell, the battery case 14' swells, with the result that the sealing region of the battery case 14' is deformed in the shape of a disordered curve according to the deformed shape of the remaining region of the battery case 14'. At this time, the section of the cathode lead 11', made of aluminum exhibiting high flexibility, is somewhat deformed according to the deformed shape of the sealing region.

On the other hand, as shown in FIG. 4, the anode lead 12' made of a nickel-copper alloy exhibiting lower flexibility than the cathode lead 11' is not deformed at all or a little deformed when the sealing region of the battery case 14' is deformed due to the increase of the internal pressure of the battery cell. As a result, the deformation force applied to the sealing region remains at the battery case 14' around the anode lead 12' as stress. Consequently, when the internal pressure of the battery cell increases more and more, the sealing region, particularly a weak portion 16' of the sealing region, may break due to the stress.

Figure 6:
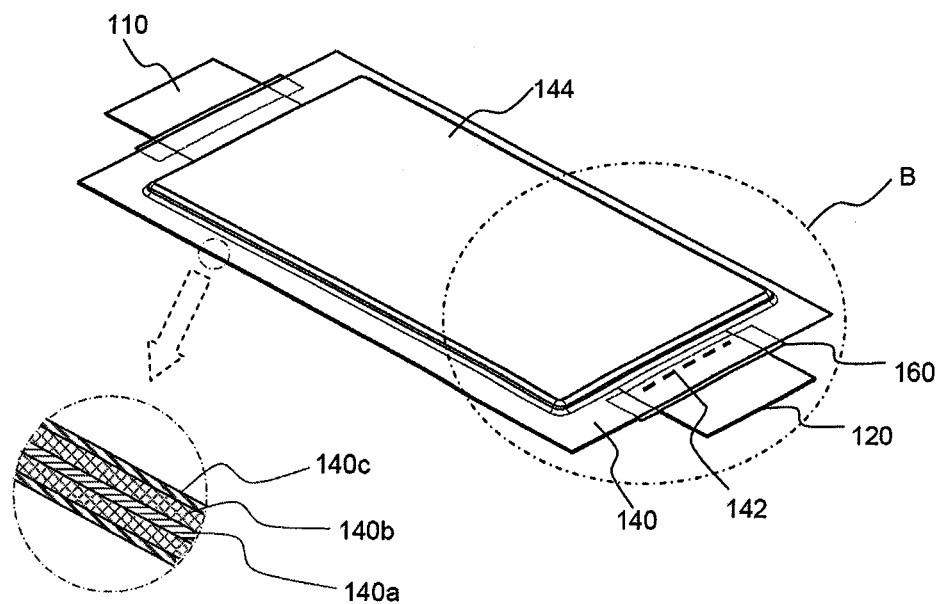
FIG. 6 is a perspective view illustrating a pouch-shaped battery cell with slits according to an embodiment of the present invention.
Figure 7:
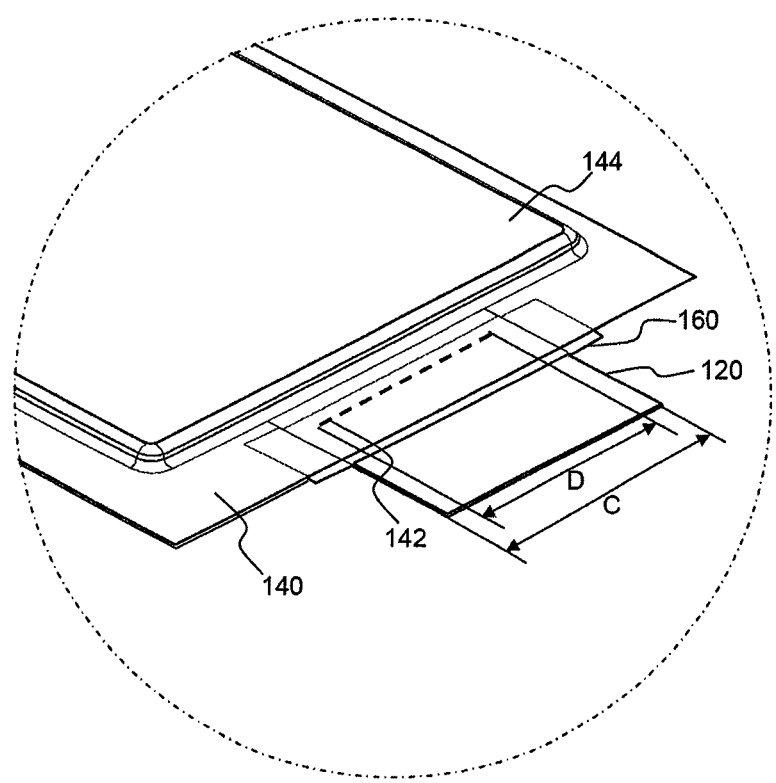
FIG. 7 is a partially enlarged view illustrating region B of FIG. 6 where an anode lead protrudes.

FIG. 6 is a perspective view typically illustrating a pouch-shaped battery cell with slits according to an embodiment of the present invention, and FIG. 7 is an enlarged view typically illustrating region B of FIG. 6 where an anode lead protrudes.

Referring to these drawings, the pouch-shaped battery cell 100 is constructed in a structure in which a cathode lead 110 and an anode lead 120 protrude from upper and lower ends of a battery case 140, respectively, while the cathode lead 110 and the anode lead 120 are opposite to each other. The battery case 140 is constructed in a two-unit structure including an upper case and a lower case. An electrode assembly is mounted in a receiving part 144 defined in the battery case 140, i.e., between the upper case and the lower case. Insulative films 160 are attached to the top and bottom of the cathode lead 110 and the anode lead 120, which are connected to electrode tabs (not shown) of the electrode assembly, and the battery case 140 is sealed by a thermal welding method.

Specifically, the upper case and the lower case of the battery case 140 each include an outer resin layer 140a made of oriented nylon film (ONy), a metal barrier layer 1400b made of aluminum, and an inner resin layer 140c made of cast polypropylene (CPP). The inner resin layer 140c of the upper case and the inner resin layer 140c of the lower case are partially melted and joined to each other by thermal welding, with the result that the battery case is sealed.

Also, slits 142 are formed on the battery case at the sealing region corresponding to the anode lead 120 in the lateral direction of the battery case 140 such that the slits 142 are arranged with a length D equivalent to 80% of the width C of the electrode lead. Consequently, when the internal pressure of the battery cell increases due to the abnormal operation of the battery cell, a portion where the slits 142, having a low sealing force than the remaining sealing region, are formed becomes open first, with the result that gas in the battery case 140 is discharged outside. The slits 142 are formed on the battery case at the sealing region corresponding to the anode lead 120, and therefore, the slits 142 do not affect the sealing force of the sealing region during the normal operation of the battery cell.

Figure 8:
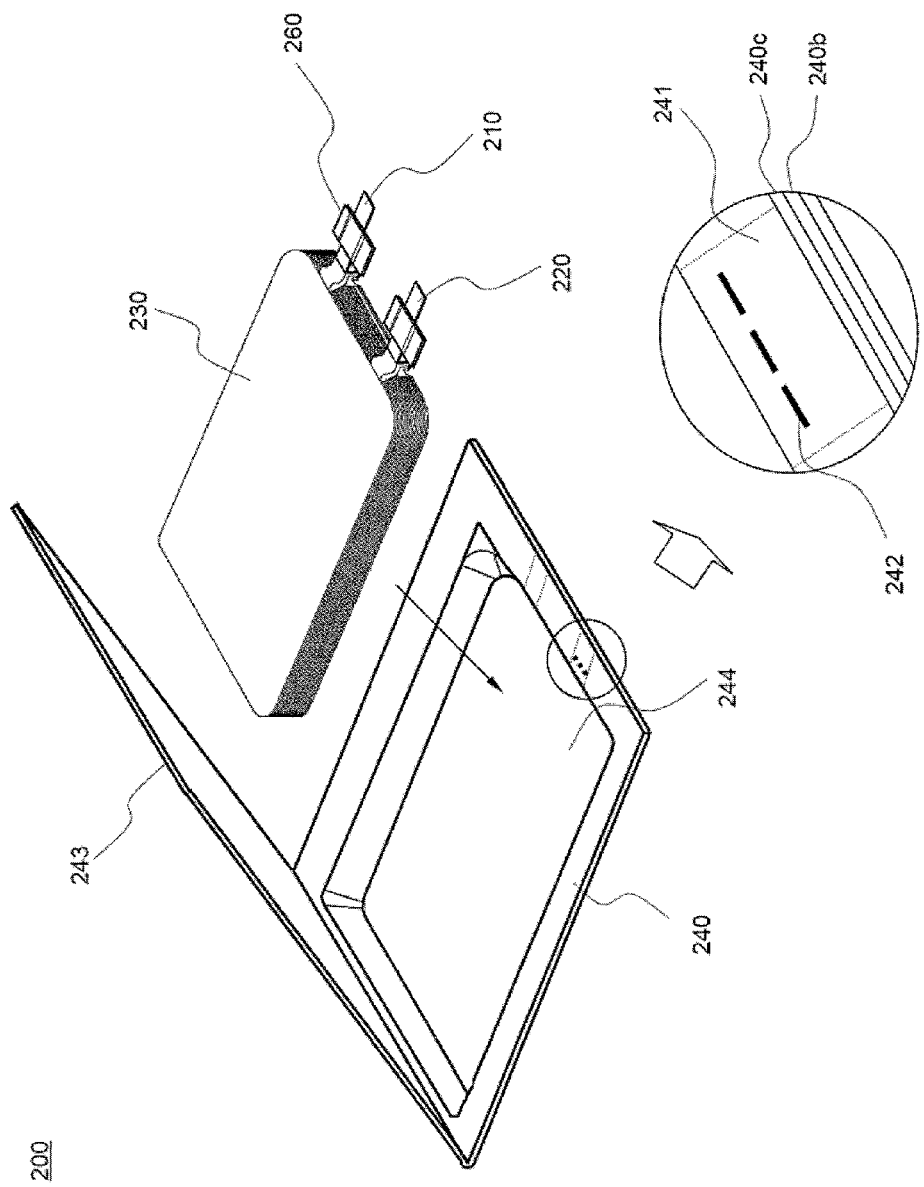
FIG. 8 is an exploded perspective view illustrating a pouch-shaped battery cell with slits according to another embodiment of the present invention.
Figure 9:
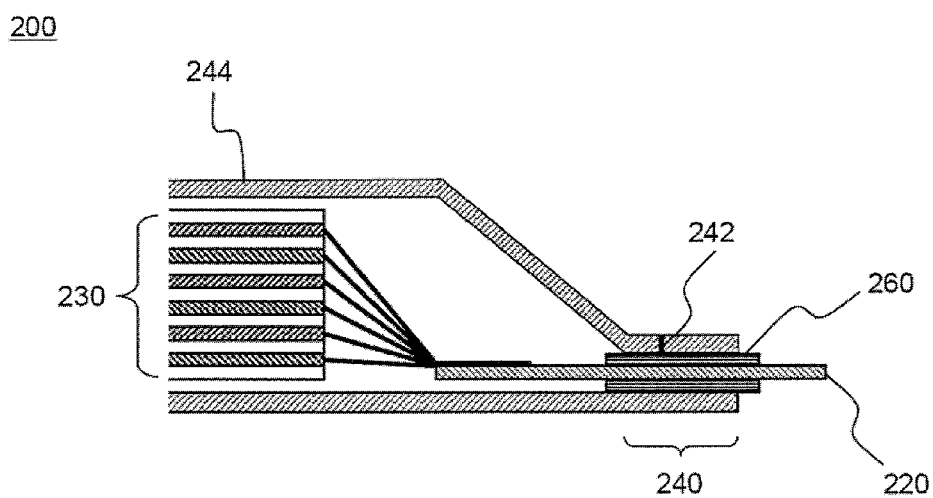
FIG. 9 is an enlarged view, in vertical section, illustrating the upper end of the battery cell of FIG. 8.

FIG. 8 is an exploded perspective view typically illustrating a pouch-shaped battery cell with slits according to another embodiment of the present invention, and FIG. 9 is an enlarged view, in vertical section, typically illustrating the upper end of the battery cell of FIG. 8.

Referring to these drawings, a battery case includes a receiving part 244 having a space for receiving an electrode assembly 230 defined therein and a cover 243 for sealing the receiving part 244. The receiving part 244 and the cover 243 are connected to each other in an integrated structure. At the edge of the receiving part 244 is formed a sealing part 240 for sealing the battery cell 200, while the cover 243 is located at the edge of the receiving part 244, by thermal welding.

The electrode assembly 230 is constructed in a structure in which both a cathode lead 210 and an anode lead 220 are formed at one side of the electrode assembly 230. To the outer surfaces of the electrode leads 210 and 220 are attached insulative films 260 having a width greater than that of the sealing part 240.

The electrode assembly with the above-stated construction is mounted in the receiving part 244 such that the region of the electrode assembly where the electrode leads 210 and 220 protrude is located at the upper end side of the battery case.

At this time, a weak part 242 is formed at a portion of the sealing part 240 corresponding to the region where the anode lead 220 is located, i.e., an electrode lead correspondence portion 241. The weak part 242 is arranged in a line in the lateral direction of the electrode assembly 230. Each weak part 242 is formed in the shape of a slit, i.e., a hole having relatively small width and relative large length. As shown in FIG. 9, the slits 242 are formed through the entire sealing part. Alternatively, the slits 242 may be formed through only the inner resin layer 240c, which is located at the innermost position of the sealing part 240, and/or the barrier layer 240b of the sealing part 240. Also, the slits 242 may be formed either at the edge sealing part side of the receiving part 244 or at the edge sealing part side of the cover 243.

When the internal pressure of the battery cell with the above-stated construction increases due to the abnormal operation of the battery cell, the anode lead correspondence portion 241 where the slits 242 are formed becomes open first, with the result that gas in the battery cell is discharged outside. Since the insulative films 260 are attached to the anode lead 220, and therefore, the slits 242 do not affect the sealing force of the sealing region during the normal operation of the battery cell.

Hereinafter, an example of the present invention will be described in detail. It should be noted, however, that the scope of the present invention is not limited by the illustrated example.

Example 1

A mixture including 95 weight percent of LiCoC$_2$, 2.5 weight percent of Super-P (a conducting agent), and 2.5 weight percent of PVdF (a coupling agent), as a cathode active material, was added to NMP (N-methyl-2-pyrroli- done), as a solvent, to manufacture cathode mixture slurry. Also, a mixture including 95 weight percent of artificial graphite, 1 weight percent of Super-P (a conducting agent), and 4 weight percent of PVdF (a coupling agent), as an anode active material, was added to NMP, as a solvent, to manufacture anode mixture slurry. The cathode mixture slurry and the anode mixture slurry were applied to an aluminum foil and a copper foil, respectively, and then the aluminum foil and the copper foil were cut to manufacture cathode plates and anode plates, respectively. The cathode plates and the anode plates were sequentially stacked, while CELLGUARD™ (TONEN), as separators, was respectively disposed between the cathode plates and the anode plates, to manufacture an electrode assembly.

Electrode leads were connected to electrode tabs of the electrode assembly by ultrasonic welding, and, as shown in FIG. 6, slits were formed on a sealing region of a battery case corresponding to the anode lead, made of a nickel-copper alloy, such that the slits were arranged with a length equivalent to 80% of the width of the anode lead. Subsequently, the electrode assembly was mounted in the battery case in a sealed state to manufacture a battery.

Comparative Example 1

A battery was manufactured in the same manner as Example 1 except that slits were not formed on the sealing region of the battery case corresponding to the anode lead.

Comparative Example 2

A battery was manufactured in the same manner as Example 1 except that notches were formed at the central regions of insulative films attached to the cathode lead and the anode lead, and slits were not formed on the sealing region of the battery case corresponding to the anode lead, as disclosed in Korean Patent Application Publication No. 2006-112035.

Experimental Example 1

Internal pressure increasing experiments were carried out to 30 batteries manufactured according to Example 1 and Comparative examples 1 and 2. The results are indicated in Table 1 below. In the internal pressure increasing experiments, the internal pressure of the respective 30 batteries was increased by 0.1 kgf/mm$^2$ at 30-second intervals using air until wrapping materials of the batteries were vented, and comparison was made between regions where the vent parts were formed.

TABLE 1

|  | Number of batteries having vented side sealing regions | Number of batteries having vented anode lead sealing regions | Number of batteries having vented cathode lead sealing regions |
|---|---|---|---|
| Example 1 | 0 | 30 | 0 |
| Comparative example 1 | 27 | 3 | 0 |
| Comparative example 2 | 2 | 9 | 19 |

As can be seen from Table 1, when the internal pressure increasing experiments were carried out to the 30 batteries manufactured according to Example 1, all of the batteries were uniformly vented at the anode lead sealing regions thereof. Also, the internal pressures of the batteries when the batteries were vented were approximately the same.

On the other hand, most of the batteries manufactured according to Comparative example 1 were vented at the side sealing regions thereof, the vented regions were not uniform, and the internal pressures of the batteries when the batteries were vented were not the same. For the batteries manufactured according to Comparative example 2, many batteries were vented at low internal pressures. This is presumed because the notches were formed at the insulative films, and therefore, the sealing force greatly lowered. For the batteries manufactured according to Comparative example 2, the number of the batteries vented at the cathode lead sealing regions due to the lowering of the sealability caused by the deformation of the cathode leads was relatively large. Furthermore, the batteries were vented at the cathode lead sealing regions, the anode lead sealing regions, and the side sealing regions. That is, the discharge direction of gas was not uniform.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery cell according to the present invention is capable of discharging gas outside in a predetermined direction through the weak portion when the internal pressure of the battery cell increases due to the abnormal operation of the battery cell, such as overcharge, overdischarge, an internal short circuit, or the like. Consequently, the present invention has the effect of improving the safety of the battery. Also, the battery cell according to the present invention does not need any additional member. Consequently, the present invention has the effect of reducing the manufacturing costs of the battery.

What is claimed is:

1. A battery cell constructed in a structure in which an electrode assembly is mounted in a battery case made of a laminate sheet including a metal layer and at least one resin layer, the battery case being thermally welded along the edge of a receiving part thereof to form a sealing part, the electrode assembly extending longer in the longitudinal direction than the lateral direction, the electrode assembly having first and second electrode leads, and the first electrode lead having a lower flexibility than the second electrode lead,
   wherein a weak part is formed at a portion of the sealing part corresponding to the first electrode lead, the weak part being physically deformable, such that internal gas is discharged outside through the weak part, when predetermined pressure is applied to the weak part, and the weak part is not formed at the second electrode lead, and
   wherein the weak part is formed in a slit structure in which slits are arranged in the lateral direction of the electrode assembly.

2. The battery cell according to claim 1, wherein the battery case is a pouch-shaped case, and insulative films are attached to the top and bottom of the electrode leads in contact with the battery case.

3. The battery cell according to claim 1, wherein the battery case is constructed in a structure in the metal layer includes a metal barrier layer and the at least one resin layer includes an outer resin layer and a thermally-weldable inner resin layer, the outer resin layer is attached to an outer surface of the metal barrier layer, and the thermally-weldable inner resin layer is attached to an inner surface of the metal barrier layer.

4. The battery cell according to claim 1, wherein the electrode assembly is constructed in a structure in which the first electrode lead is opposite the second electrode lead.

5. The battery cell according to claim 1, wherein the second electrode lead is made of aluminum, and the first electrode lead is made of a nickel-copper alloy.

6. The battery cell according to claim 5, wherein the second electrode lead is a cathode lead, and the first electrode lead is an anode lead.

7. The battery cell according to claim 1, wherein the electrode assembly is constructed in a folding structure, a stacking structure, or a stacking/folding structure.

8. The battery cell according to claim 1, wherein the slits extend through the sealing part.

9. The battery cell according to claim 1, wherein the slits are arranged with a length equivalent to 50 to 90% of the width of the electrode lead.

10. A battery module including the battery cell according to claim 1 as a unit cell.

* * * * *